US005347074A

United States Patent [19]

Hochleitner et al.

[11] Patent Number: 5,347,074

[45] Date of Patent: Sep. 13, 1994

[54] FIXATION OF HEAVY METALS, MERCURY RECOVERY AND DIOXINS DESTRUCTION IN SCRUBBED MUNICIPAL SOLID WASTE INCINERATOR ASH

[75] Inventors: Wolfgang A. Hochleitner, Allentown; Stephen P. Goff, Orefield, both of Pa.

[73] Assignee: Air Products and Chemicals, Inc., Allentown, Pa.

[21] Appl. No.: 53,985

[22] Filed: Apr. 27, 1993

[51] Int. Cl.[5] .......................... C04B 18/08; C04B 18/06

[52] U.S. Cl. .......................... 588/256; 588/231; 588/233; 588/251; 588/249; 106/710; 106/DIG. 1; 106/287.18; 405/123

[58] Field of Search .................. 106/707, 710, DIG. 1, 106/287.18; 423/DIG. 20; 588/231, 233, 248, 251, 256; 405/123

[56] References Cited

U.S. PATENT DOCUMENTS

| | | | |
|---|---|---|---|
| 5,220,111 | 6/1993 | Bucci et al. | 106/710 |
| 5,220,112 | 6/1993 | Bucci et al. | 106/710 |

*Primary Examiner*—Mark L. Bell
*Assistant Examiner*—Michael Marcheschi
*Attorney, Agent, or Firm*—Robert J. Wolff; William F. Marsh; James C. Simmons

[57] ABSTRACT

Fly ash generated from incineration of municipal solid waste (MSW) when placed in landfills can under mild acid conditions can leach lead and cadmium. A process for stabilizing heavy metals in this fly ash is presented which involves calcining the fly ash in the presence of an oxygen containing gas stream at a temperature greater than about 400° C. and less than about 600° C. for times from about 170 seconds up to about 5 hours fly ash which has been subjected to calcium scrubbing for acid gas removal. Such treated MSW fly ash will give leachates containing heavy metal concentrations less than the EPA regulatory limit.

1 Claim, No Drawings

FIXATION OF HEAVY METALS, MERCURY RECOVERY AND DIOXINS DESTRUCTION IN SCRUBBED MUNICIPAL SOLID WASTE INCINERATOR ASH

FIELD OF THE INVENTION

The present invention relates to the treatment of heavy metals-containing fly ash in order to (1) prevent or reduce substantially the amount of heavy metals, such as lead and cadmium, which may leach from the ash; (2) recover mercury from the fly ash; (3) destroy dioxins in the fly ash and (4) prevent elemental arsenic and selenium from contaminating the purge stream.

BACKGROUND OF INVENTION

U.S. Pat. No. 5,220,111 by Bucci et al, teaches a thermal treatment process for the stabilization of heavy metals-containing fly ash obtained by subjecting a flue gas containing acid gas components to scrubbing with an aqueous slurry of a calcium-containing compound and to particulate separation to recover the fly ash. The thermal treatment process comprises heating the calcium scrubbed fly ash to a temperature in the range from about 375° C. to about 650° C. and maintaining said temperature for a period of time from about 170 seconds to about five hours while in the presence of an oxygen containing gas to produce a thermally treated fly ash and a purge gas.

There ape several problems, however, relating to the temperature range in Bucci as follows:

(1) At temperatures below 400° C., complete mercury recovery of any mercury which may be contained in the fly ash is not possible. Elemental mercury will not volatize below 357° C. and mercury(I) chloride, suspected to form in reactions between mercury and halogen gases, will remain a solid below 400° C. Additionally, dioxins ape only partially destroyed at temperatures below 400° C.

(2) At temperatures above 600° C., elemental arsenic and selenium will volatize and subsequently contaminate the purge stream from the thermal treatment process.

It is an object of the present invention to overcome these problems by narrowing the temperature range in Bucci.

BRIEF SUMMARY OF INVENTION

The present invention concerns a thermal treatment process for the stabilization of heavy metals-containing fly ash obtained by subjecting a flue gas containing acid gas components to scrubbing with an aqueous slurry of a calcium-containing compound and to particulate separation to recover the fly ash which thermal treatment process comprises heating the calcium scrubbed fly ash to a temperature in the range from about 375° C. to about 650° C. and maintaining said temperature for a period of time from about 170 seconds to about five hours while in the presence of an oxygen containing gas to produce a thermally treated fly ash and a purge gas. The present invention is an improvement to the above-described process in order to (1) volatize and subsequently recover at least a portion of any mercury which may be contained in the fly ash; (2) destroy any dioxins which way be contained in the fly ash and (3) prevent any elemental arsenic and selenium which may be contained in the fly ash from volatizing and subsequently contaminating the purge gas. The improvement comprises:.

(a) narrowing said temperature range from about 375° C.–650° C. to about 400° C.–600° C.;

(b) separating the thermally treated fly ash from the purge gas; and (c) cooling the separated purge gas to a temperature below 357° C. in order to condense out and recover at least a portion of the mercury.

In one embodiment of the present invention, the exit gas from the mercury condenser is recycled back to the flue gas producing combustor or a point upstream from any air pollution control devices. In this embodiment, high mercury recovery in the initial mercury condenser pass is not required.

DETAILED DESCRIPTION OF INVENTION

In this specification the term fly ash will be used to describe the finely divided particulate material that can be separated from a gaseous stream in which it is entrained and which has been subjected to calcium scrubbing. Illustrative of such particulate materials are those obtained from the flue gas from various combustion techniques. Thus, for example, the combustion or incineration of a carbon-, heavy metal- and halogen-containing material, such as refuse material, typically municipal solid waste, produces an ash product and an exit gas stream in which are entrained solid particles. Since halogens, and particularly chlorine, in the form of various hydrogenated or chlorinated polymers are present in the trash being fed to the incinerator, hydrogen halides, particularly hydrogen chloride, are major products from the incineration of these materials. A sizable amount of the hydrogen halides, especially chlorides, that are formed are swept in the gaseous stream from the incineration zone along with various volatile metal halides, particularly chlorides, of lead and cadmium. It is by this mechanism that a portion of the heavy metals present in the refuse escapes from the incineration section of the incinerator and becomes incorporated into the fly ash product.

If the effluent gas stream contains acid gases, the effluent gas stream, along with the acid gases, heavy metal halides (including chlorides) and particulate matter, is passed into intimate contact with an aqueous calcium-containing material, such as a slurry, suspension or emulsion of a chemical agent such as, for example, slaked lime, limestone or other calcium-containing material capable of forming calcium oxide under the conditions of elevated temperature employed in this invention, which reacts with the acid gases to form new chemical compounds. These reactions result in removal of hydrogen chloride and sulfur dioxide from the gaseous exit stream. The reaction of the lime or slaked lime traps the hydrogen chloride as calcium chloride and sulfur dioxide as calcium sulfite, which is subsequently oxidized to calcium sulfate.

One typical acid gas removal system operates by spraying a slurry of slaked lime into the path of the exiting process gas stream. The intimate contact of the acid gases with the droplets of slaked lime slurry results in the acid gases dissolving in the liquid film and reacting with the calcium hydroxide present in the film. The reactions of both hydrogen chloride and sulfur dioxide with the slurry results in format&on of calcium chloride and calcium sulfite, which readily oxidizes to calcium sulfate. As the slurry water is removed through drying in the hot gaseous stream solid particles form. A portion of these solids become entrained within the flow of the flue gas stream and thus makes up a portion of the fly ash from the process. The remaining portion of the fly ash mixture is comprised of unreacted scrubber agent and scrubber product that fails to become entrained in the gas stream and is separated by gravity and may be combined with the suspended fly ash material that is collected in the particulate collection section.

In another typical acid gas removal system, the exiting process gas stream is passed through an aqueous slurry of limestone. The intimate contact of the acid gases with the slurry of limestone also results in the acid gases dissolving in the slurry and reacting with the calcium oxide present in the film. The reactions of both hydrogen chloride and sulfur dioxide with the slurry results in formation of calcium chloride and calcium sulfite, which readily oxidizes to calcium sulfate.

In still another type of system, more traditionally employed in power generating systems, a dry calcium-containing material, such as tricalcium oxide, can be introduced into a stream of flue gas by aspiration. This type of system is quite effective for the removal of acid gas components.

In order to promote the removal of higher concentrations of the acid gases, especially sulfur dioxide, a stoichiometric excess of the calcium compound, e.g. slaked lime, limestone, thermal precursor of calcium oxide, etc., required to react with all acid gas components capturable by the contacting can be used. Typically, for municipal waste incinerators, from about 1 to about 4 times the stoichiometric amount of lime is used and generally greater than about 1. Stoichiometric ratios of greater than about 1.2:1 and at times greater than about 1.5:1 can be used. Normally, the stoichiometric amount of lime used is not more than about 3.5 times, typically not more than about 2.8 times the amount stoichiometrically required to react with such acid gas components. This translates to a usage of from about 10 to about 40 pounds of lime per ton of refuse with the lower limits corresponding to the stoichiometric quantities of 1.2 and 1.5 being about 12 pounds and about 15 pounds, respectively per ton of refuse. Usually, no more than about 35 pounds of lime per pound of refuse are used and preferably no more than about 28 pounds of lime per pound of refuse are employed.

To express this in another manner, the amount of lime employed in the scrubbing operation is in the range from about 0.02 to about 0.4 pounds of lime per thousand standard cubic foot (MSCF) of flue gas and preferably at least about 0.03, more preferably at least about 0.05, pounds of lime per MSCF. Usually, no more than about 0.3 pounds of lime per MSCF are used and preferably no more than about 0.2 pounds of lime per MSCF are employed.

In many instances an excess of strong base, due to the presence of unreacted lime and slaked lime, is typically carried through with the flue gas and is collected in the particulate collection device.

The entrained acid gas products from the scrubber section, solid particles from the incineration section, and particles of unreacted scrubber reagent, namely the excess of slaked lime reagent, are collected in a particulate collection system to prevent their escape into the ambient air. Several technologies have been effectively employed to collect particulate matter, of which many have found use in waste incinerator applications. These include cyclones, electrostatic precipitators, filtering systems, e.g. bag houses, and centrifuges. The method of coupling of these systems with incinerators may vary depending on the application but all can effectively remove both the ash coming from the incineration section as well as the solids generated in the gas scrubbing section.

Both the solids that are entrained within a flow of the flue gas stream and the mixture of unreacted scrubber agent and scrubber product that become entrained in the gas stream will be enriched in heavy metals that deposit when the effluent gas from the incinerator contacts the scrubbing agent.

When the flue gas has been subjected to scrubbing for acid gas removal, the calcium-containing material contained with the fly ash can be calcium oxide, calcium carbonate, calcium hydroxide, calcium sulfite, calcium sulfate, calcium chloride or any of the other calcium compounds formed during the scrubbing operation. The intimate contact of these materials with the heavy metal materials is important so as to promote the reaction of the soluble and volatile heavy metal component with the active agent.

In accordance with this invention the scrubbed fly ash which includes calcium-containing material is placed within a heated zone in the presence of an oxygen containing gas at a temperature which is greater than about 400° C. but less than about 600 ° C. The time the ash is kept at temperature is important, being at least about 170 seconds up to about five hours. To those experienced in the apt, additional testing and improved control characteristics can result in reduced stabilization times.

The presence of oxygen during the thermal treatment is essential for stabilization to occur. We have found that heating in the absence of sufficient oxygen fails to promote the transformations necessary to bind the heavy metals in such a manner to prevent their dissolution into groundwater. The treatment can be conducted in the presence of an oxygen-containing gas which can be air, air enriched with oxygen, or a process gas stream containing sufficient oxygen. The use of heated gasses has the additional advantage of providing both the oxygen and the heat required by this process. It is also believed that higher oxygen partial pressures also promotes faster stabilization at a particular temperature. It has also been found advantageous to effect the thermal treatment of this invention by flowing, preferably under turbulent conditions, the oxygen-containing gas stream over the ash to be treated. It is believed that this movement of the gas results in a better and more intimate contacting of the ash and the oxygen-containing gas, thus resulting in a more efficient thermal treatment and permitting, for example, a lower temperature than would be required under more quiescent conditions. In addition to decreased temperatures, more turbulent conditions may with increased testing and improved control characteristics result in decreased treatment times as well.

The process of this invention can be conducted in a batch or continuous manner.

A common problem that occurs in handling solids of the small size typical of fly ash materials is their propensity to form dust and become airborne within the surrounding air. Often water or dust inhibitors have to be added to keep down the dust that forms when handling these materials, especially in transferring these solids between containers or into vehicles for transport. A unique benefit of the thermal treatment process as disclosed herein is that the average particle size of the thermally treated material increases making the material considerably less dusty.

We claim:

1. In a process for the stabilization of heavy metals-containing fly ash obtained by subjecting a flue gas containing acid gas components to scrubbing with an aqueous slurry of a calcium-containing compound wherein the calcium-containing compound is present in an amount from about 1.2 to about 4 times the stoichiometric amount required to capture the acid gas components in the flue gas and to particulate separation to recover the fly ash, which process comprises heating the fly ash to a temperature in the range from about 375° C. to about 650° C. and maintaining said temperature for a period of time from about 170 seconds to about five hours while in the presence of an oxygen-containing gas to produce a thermally treated fly ash and a purge gas, the improvement for (1) volatizing and subsequently recovering any mercury which may be contained in the fly ash; (2) destroying any dioxins which may be contained in the fly ash and (3) preventing any elemental arsenic and selenium which may be contained in the fly ash from volatizing and subsequently contaminating the purge gas comprising:

(a) narrowing said temperature range from about 375° C.–650° C. to about 400° C.–600° C.;

(b) separating the thermally treated fly ash from the purge gas; and (c) cooling the separated purge gas to a temperature below 357° C. in order to condense out and recover at least a portion of the mercury.

* * * * *